United States Patent
Qiao et al.

(10) Patent No.: US 11,282,516 B2
(45) Date of Patent: Mar. 22, 2022

(54) HUMAN-MACHINE INTERACTION PROCESSING METHOD AND APPARATUS THEREOF

(71) Applicant: BEIJING BAIDU NETCOM SCIENCE TECHNOLOGY CO., LTD., Beijing (CN)

(72) Inventors: Shuangshuang Qiao, Beijing (CN); Kun Liu, Beijing (CN); Yang Liang, Beijing (CN); Xiangyue Lin, Beijing (CN); Chao Han, Beijing (CN); Mingfa Zhu, Beijing (CN); Jiangliang Guo, Beijing (CN); Xu Li, Beijing (CN); Jun Liu, Beijing (CN); Shuo Li, Beijing (CN); Shiming Yin, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 236 days.

(21) Appl. No.: 16/278,679

(22) Filed: Feb. 18, 2019

(65) Prior Publication Data
US 2020/0005781 A1  Jan. 2, 2020

(30) Foreign Application Priority Data
Jun. 29, 2018 (CN) .......................... 201810695300.4

(51) Int. Cl.
*G10L 15/22* (2006.01)
*G10L 15/24* (2013.01)
(Continued)

(52) U.S. Cl.
CPC ............ *G10L 15/22* (2013.01); *G06V 40/174* (2022.01); *G10L 15/24* (2013.01); *G10L 25/63* (2013.01); *G10L 2015/223* (2013.01)

(58) Field of Classification Search
CPC ... G10L 25/63; G10L 15/24; G10L 2015/223; G10L 15/22; G06K 9/00302
See application file for complete search history.

(56) References Cited

U.S. PATENT DOCUMENTS

| | | | |
|---|---|---|---|
| 9,812,151 B1 * | 11/2017 | Amini | G06V 20/52 |
| 2011/0143811 A1 * | 6/2011 | Rodriguez | H04W 4/16 |
| | | | 455/556.1 |

(Continued)

FOREIGN PATENT DOCUMENTS

| | | |
|---|---|---|
| CN | 106055662 A | 10/2016 |
| CN | 106373569 A | 2/2017 |

(Continued)

OTHER PUBLICATIONS

The Chinese First Examination Report of corresponding Chinese application No. 201810695300.4, dated Apr. 18, 2019.

*Primary Examiner* — Michael Colucci
(74) *Attorney, Agent, or Firm* — J.C. Patents

(57) ABSTRACT

Embodiments of the present disclosure provide a human-machine interaction processing method, an apparatus thereof, a user terminal, a processing server and a system. On the user terminal side, the method includes: receiving an interaction request voice inputted from a user, and collecting video data of the user when inputting the interaction request voice; obtaining an interaction response voice corresponding to the interaction request voice, where the interaction response voice is obtained according to expression information of the user when inputting the interaction request voice and included in the video data; and outputting the interaction response voice to the user. The method imbues the interaction response voice with an emotional tone that matches the current emotion of the user, so that the human-machine (Continued)

interaction process is no longer monotonous, greatly enhancing the user experience.

12 Claims, 10 Drawing Sheets

(51) Int. Cl.
*G10L 25/63* (2013.01)
*G06V 40/16* (2022.01)

(56) References Cited

U.S. PATENT DOCUMENTS

| | | | | |
|---|---|---|---|---|
| 2012/0130717 | A1* | 5/2012 | Xu | H04L 51/10 704/258 |
| 2017/0300512 | A1* | 10/2017 | Goldberg | G06F 16/65 |
| 2018/0091832 | A1* | 3/2018 | Zeiler | H04N 21/2187 |
| 2018/0103903 | A1* | 4/2018 | Tzvieli | A61B 5/4884 |
| 2019/0019067 | A1* | 1/2019 | Dettori | G06V 40/20 |
| 2019/0143527 | A1* | 5/2019 | Favis | B25J 13/003 700/264 |

FOREIGN PATENT DOCUMENTS

| | | |
|---|---|---|
| CN | 106503786 A | 3/2017 |
| CN | 107301168 A | 10/2017 |
| CN | 107609511 A | 1/2018 |

* cited by examiner

User    User terminal    Processing server

| User terminal | Processing Server | Prediction model server |

HUMAN-MACHINE INTERACTION PROCESSING METHOD AND APPARATUS THEREOF

CROSS-REFERENCE TO RELATED APPLICATIONS

This application claims priority to Chinese Patent Application No. 201810695300.4, filed on Jun. 29, 2018, which is hereby incorporated by reference in its entirety.

TECHNICAL FIELD

Embodiments of the present disclosure relate to artificial intelligence technologies, and in particular, to a human-machine interaction processing method, an apparatus thereof, a user terminal, a processing server and a system.

BACKGROUND

With the continuous development of robotic technology, robots are featuring increasing level of intelligence in that the robots can not only accomplish corresponding operations according to the user's instructions, but also simulate a real person to interact with the user. Voice-based human-machine interaction is an important means for interaction. In voice-based human-machine interaction, the user issues a voice command, and the robot performs a corresponding operation accordingly and playbacks the response voice to the user.

In existing voice-based human-machine interaction scenarios, it only support modification of the tone or decibel to the response voice. For the emotional tone of the response voice, only a fixed response voice that does not reflect any emotional tone is supported.

However, this way of response in the prior art is too monotonous, with suboptimal user experience.

SUMMARY

Embodiments of the present disclosure provide a human-machine interaction processing method, an apparatus thereof, a user terminal, a processing server and a system, which are used to solve the problem in the prior art where a lack of emotional tone in a response voice of a human-machine interaction leads to suboptimal user experience.

A first aspect of the embodiments of the present disclosure provides a human-machine interaction processing method, including:

receiving an interaction request voice inputted from a user, and collecting video data of the user when inputting the interaction request voice;

obtaining an interaction response voice corresponding to the interaction request voice, wherein the interaction response voice is obtained according to expression information of the user when inputting the interaction request voice and included in the video data; and outputting the interaction response voice to the user.

Further, the collecting the video data of the user when inputting the interaction request voice includes:

collecting, via a binocular camera, the video data of the user when inputting the interaction request voice.

Further, the obtaining an interaction response voice corresponding to the interaction request voice, wherein the interaction response voice is obtained according to the expression information of the user when inputting the interaction request voice and included in the video data includes:

sending the interaction request voice and the video data to a processing server, causing the processing server to analyze the video data to obtain the expression information of the user, and obtain the interaction response voice according to the expression information and the interaction request voice; and receiving the interaction response voice fed back from the processing server.

Further, voice content of the interaction response voice corresponds to the expression information, and/or, audio feature of the interaction response voice corresponds to the expression information.

A second aspect of the embodiments of the present disclosure provides a human-machine interaction processing method, including:

receiving an interaction request voice and video data sent from a user terminal, where the interaction request voice is inputted by a user on the user terminal, and the video data is collected by the user terminal when the user inputs the interaction request voice;

analyzing the video data to obtain expression information of the user;

obtaining an interaction response voice according to the expression information and the interaction request voice; and sending the interaction response voice to the user terminal, causing the user terminal to playback the interaction response voice to the user.

Further, the analyzing the video data to obtain expression information of the user includes:

obtaining a key facial image from the video data; and applying expression recognition to the key facial image to obtain the expression information of the user.

Further, the applying expression recognition to the key facial image to obtain the expression information of the user includes:

sending an expression classification request including the key facial image to a prediction model server, causing the prediction model server to apply the expression recognition to the key facial image to obtain the expression information of the user; and receiving the expression information of the user sent from the prediction model server.

Further, the sending the expression classification request including the key facial image to the prediction model server includes:

sending the expression classification request including the key facial image to the prediction model server which has processing resource, according to a load balancing policy.

Further, the applying expression recognition to the key facial image to obtain the expression information of the user includes:

inputting each key facial image into a facial expression recognition model to obtain expression information corresponding to each key facial image; and applying weight to all of expression information corresponding to each key facial image to obtain expression information of the user.

Further, the obtaining the interaction response voice according to the expression information and the interaction request voice includes:

applying voice recognition to the interaction request voice to obtain a request voice text; and obtaining the interaction response voice according to the request voice text and the expression information, where voice content of the interaction response voice corresponds to the expression information, and/or, audio feature of the interaction request voice corresponds to the expression information.

A third aspect of the embodiments of the present disclosure provides a human-machine interaction apparatus, including:

a receiving module, configured to receive an interaction request voice inputted from a user, and collect video data of the user when inputting the interaction request voice;

an obtaining module, configured to obtain an interaction response voice corresponding to the interaction request voice, wherein the interaction response voice is obtained according to expression information of the user when inputting the interaction request voice and included in the video data; and an outputting module, configured to output the interaction response voice to the user.

Further, the receiving module is specifically configured to:

collect, via a binocular camera, the video data of the user when inputting the interaction request voice.

Further, the obtaining module includes:

a sending unit, configured to send the interaction request voice and the video data to a processing server, causing the processing server to analyze the video data to obtain the expression information of the user, and obtain the interaction response voice according to the expression information and the interaction request voice; and a receiving unit, configured to receive the interaction response voice fed back from the processing server.

Further, voice content of the interaction response voice corresponds to the expression information, and/or, audio feature of the interaction response voice corresponds to the expression information.

A fourth aspect of the embodiments of the present disclosure provides a human-machine interaction apparatus, including:

a receiving module, configured to receive an interaction request voice and video data sent from a user terminal, where the interaction request voice is inputted by a user on the user terminal, and the video data is collected by the user terminal when the user inputs the interaction request voice;

an analyzing module, configured to analyze the video data to obtain expression information of the user;

a processing module, configured to obtain an interaction response voice according to the expression information and the interaction request voice; and a sending module, configured to send the interaction response voice to the user terminal, causing the user terminal to playback the interaction response voice to the user.

Further, the analyzing module includes:

an obtaining unit, configured to obtain a key facial image from the video data; and a first identifying unit, configured to apply expression recognition to the key facial image to obtain the expression information of the user.

Further, the first identifying unit is specifically configured to:

send an expression classification request including the key facial image to a prediction model server, causing the prediction model server to apply the expression recognition to the key facial image to obtain the expression information of the user; and receive the expression information of the user sent from the prediction model server.

Further, the first identifying unit is specifically configured to:

send the expression classification request including the key facial image to a prediction model server which has processing resource, according to a load balancing policy.

Further, the first identifying unit is specifically configured to:

input each key facial image into a facial expression recognition model to obtain expression information corresponding to each key facial image; and apply weight to all of the expression information corresponding to each key facial image to obtain expression information of the user.

Further, the processing module includes:

a second identifying unit, configured to apply voice recognition to the interaction request voice to obtain a request voice text; and a processing unit, configured to obtain the interaction response voice according to the request voice text and the expression information, where voice content of the interaction response voice corresponds to the expression information, and/or, audio feature of the interaction response voice corresponds to the expression information.

A fifth aspect of the embodiments of the present disclosure provides a user terminal, including:

a memory, configured to store program instructions; and a processor, configured to call and execute the program instructions in the memory to perform the method steps described in the aforementioned first aspect.

A sixth aspect of the embodiments of the present disclosure provides a processing server, including:

a memory, configured to store program instructions; and a processor, configured to call and execute the program instructions in the memory to perform the method steps described in the aforementioned second aspect.

A seventh aspect of the present disclosure provides a readable storage medium storing a computer program which is configured to perform the method steps according to the aforementioned first aspect or the aforementioned second aspect.

An eighth aspect of the present disclosure provides a human-machine interaction processing system, including the user terminal according to the aforementioned fifth aspect and the processing server according to the aforementioned sixth aspect.

According to the human-machine interaction processing method, apparatus thereof, user terminal, processing server and system provided in the embodiments of the present disclosure, according to video data of the user when inputting an interaction request voice to the user terminal, the user's expression information is analyzed from the video data, and then an interaction response voice is generated according to the expression information and the interaction request voice inputted by the user, imbuing the interaction response voice with an emotional tone matching a current emotion of the user, so that the human-machine interaction process is no longer monotonous, greatly enhancing the user experience.

BRIEF DESCRIPTION OF THE DRAWINGS

In order to more clearly illustrate the embodiments of the present disclosure or the technical solutions in the prior art, the drawings required in describing the embodiments or the prior art will be briefly introduced below. Apparently, the drawings described in the following are for some embodiments of the present disclosure, and other drawings can be obtained by those skilled in the art without paying any creative labor.

DETAILED DESCRIPTION OF THE EMBODIMENTS

In order to make objectives, technical solutions and advantages of embodiments of the present disclosure clearer, the technical solutions in the embodiments of the present disclosure will be described hereunder clearly and comprehensively with reference to accompanying drawings. Obviously, the described embodiments are only a part of embodiments of the present disclosure, rather than all of them. Based on the embodiments of the present disclosure, all other embodiments obtained by persons of ordinary skill in the art without making any creative effort shall fall within the protection scope of the present disclosure.

In existing voice-based human-machine interaction scenarios, the response voice of the robot does not carry any emotional tone. Yet, human users, as creatures of emotion, may be in different moods when interacting with the robot, and users in different moods do not tend to show the same expression. If the response voice of the robot is always emotionless regardless of the expression of the user interacting with the robot, it would be over monotonous, resulting in a poor user experience.

According to the above problems, an embodiment of the present disclosure provides a human-machine interaction processing method where, according to video data of a user when inputting an interaction request voice to a user terminal, the user's expression information is analyzed from the video data, and then an interaction response voice is generated according to the expression information and the interaction request voice inputted by the user, imbuing the interaction response voice with an emotional tone matching the current emotion of the user, so that the human-machine interaction process is no longer monotonous, greatly enhancing the user experience.

Figure 1:
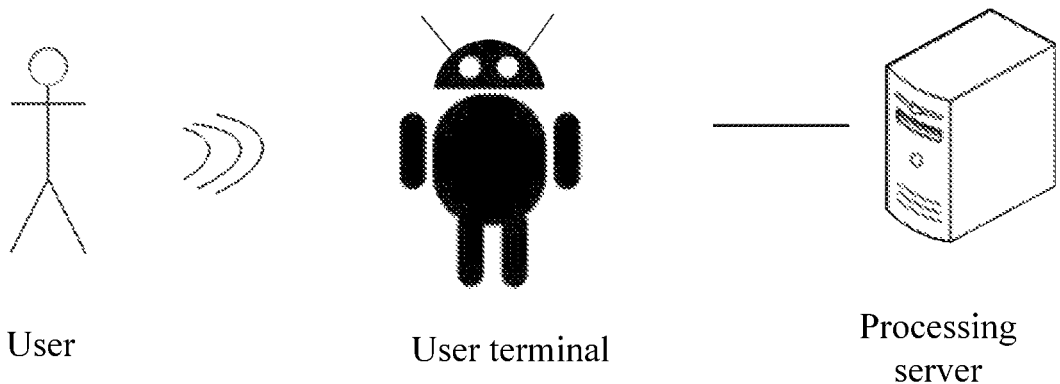
FIG. 1 is a schematic diagram illustrating an application scenario of a human-machine interaction processing method according to an embodiment of the present disclosure.

FIG. 1 is a schematic diagram illustrating an application scenario of a human-machine interaction processing method according to an embodiment of the present disclosure. As shown in FIG. 1, the method is applied to a human-machine interaction scenario involving a user, a user terminal and a processing server. The user is a real person. The user terminal, which could be the robot as described above, has a function of collecting voices uttered by the user and collecting a facial video of the user. After the user utters an interaction request voice to the user terminal, the user terminal sends the collected interaction request voice and current facial video of the user to the processing server. The processing server determines an interaction response voice according to the interaction request voice and the user's current facial video, and then returns the interaction response voice to the user terminal for the user terminal to playback the interaction response voice to the user.

Figure 2:
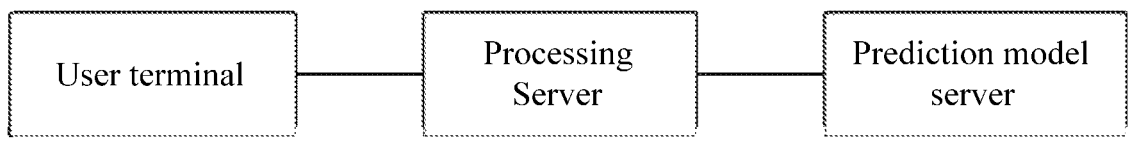
FIG. 2 is a schematic system architectural diagram involved in a human-machine interaction processing method according to an embodiment of the present disclosure.

FIG. 2 is a schematic system architectural diagram involved in a human-machine interaction processing method according to an embodiment of the present disclosure. As shown in FIG. 2, the method involves a user terminal, a processing server and a prediction model server, where functions and interactions between the user terminal and the processing server have been illustrated in the above FIG. 1, which will not be repeated herein. The prediction model server is loaded with a prediction model which can in turn be used to obtain expression information according to an expression classification request sent from the processing server and return the expression information to the processing server. The specific interaction process will be detailed in the following embodiments.

It should be noted that the processing server and the prediction model server in the embodiment of the present disclosure are logical divisions which, in a specific implementation process, could be deployed on a same physical server or on different physical servers, which will not be limited in the embodiments herein.

Technical solutions of embodiments of the present disclosure will be described from the perspectives of a user terminal and a processing server.

The following is a processing procedure on the user terminal side.

Figure 3:
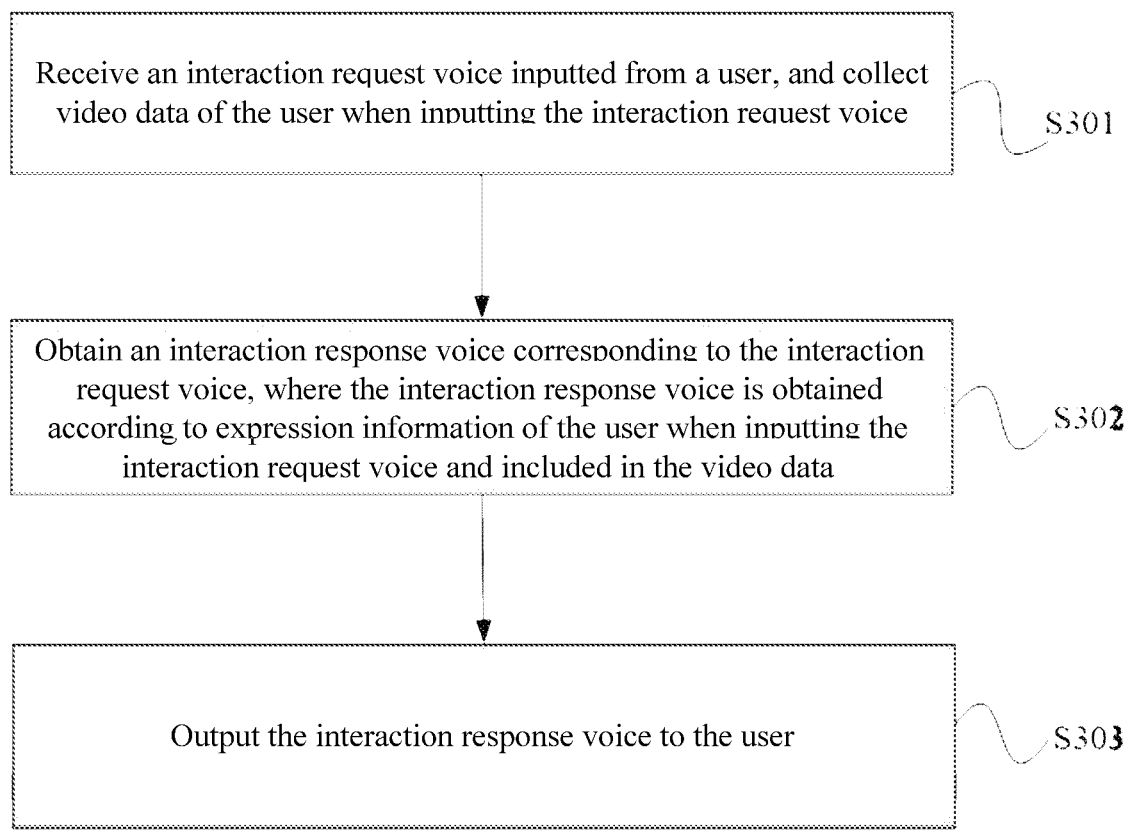
FIG. 3 is a flowchart of a first human-machine interaction processing method embodiment according to an embodiment of the present disclosure.

FIG. 3 is a flowchart of a first human-machine interaction processing method embodiment according to an embodiment of the present disclosure. The entity for implementing the method is the user terminal, which may specifically be a robot. As shown in FIG. 3, the method includes:

S301: receive an interaction request voice inputted from a user, and collect video data of the user when inputting the interaction request voice.

Optionally, the user terminal may be provided with a voice input apparatus (e.g., a microphone), and a camera.

The user terminal may receive, via the voice input apparatus, the interaction request voice from the user, and collect, via the camera, the video data of the user when inputting the interaction request voice.

Optionally, the video data may be the user's facial video, and the user terminal may adjust the camera angle and/or the like to enable the camera to capture a clear and complete facial image.

Optionally, the video data may be a video with a preset duration.

S302: obtain an interaction response voice corresponding to the interaction request voice, where the interaction response voice is obtained according to expression information of the user when inputting the interaction request voice and included in the video data.

In an optional implementation, the user terminal may interact with an processing server for the processing server to provide an interaction response voice corresponding to the interaction request voice to the user terminal.

In another optional implementation, the user terminal may analyze the features, such as tone and decibel, of the interaction request voice to determine the current emotional state of the user, and then select a corresponding interaction response voice.

S303: output the interaction response voice to the user.

Optionally, the user terminal may playback the obtained interaction response voice to the user.

In this embodiment, the user terminal receives the interaction request voice inputted from the user, and collects video data of the user when inputting the interaction request voice. Further, the user terminal obtains and outputs the interaction response voice which is obtained according to the user expression information included in the video data. Thus, the interaction response voice is imbued with an emotional tone that matches the user's current emotion, so that the human-machine interaction process is no longer monotonous, greatly improving the user's experience.

In an optional implementation, when collecting the video data of the user when inputting the interaction request voice, the user terminal may do so via a binocular camera.

On the basis of the aforementioned embodiment, this embodiment involves a specific process for the user terminal to obtain an interaction response voice by interacting with a processing server.

Figure 4:
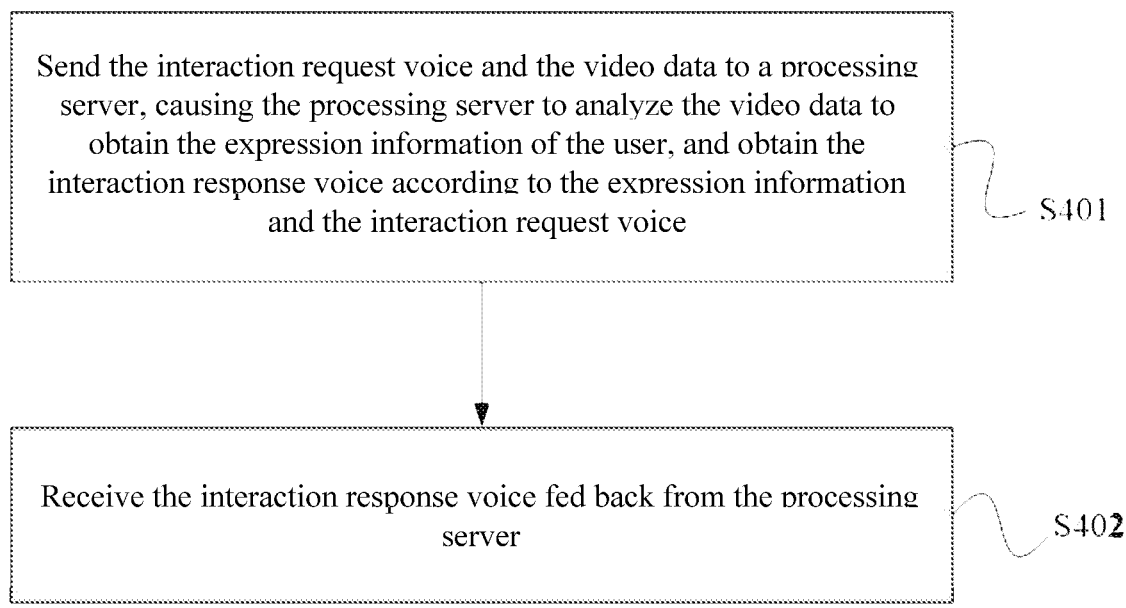
FIG. 4 is a flowchart of a second human-machine interaction processing method embodiment according to an embodiment of the present disclosure.

FIG. 4 is a flowchart of a second human-machine interaction processing method embodiment according to an embodiment of the present disclosure. As shown in FIG. 4, the step S302 includes:

S401: send the interaction request voice and the video data to a processing server, causing the processing server to analyze the video data to obtain the expression information of the user, and obtain the interaction response voice according to the expression information and the interaction request voice; and S402: receive the interaction response voice fed back from the processing server.

Optionally, the user terminal may send the interaction request voice and the video data to the processing server by using a same message. Alternatively, the user terminal may also separately send the interaction request voice and the video data to the processing server by using different messages. After receiving the interaction request voice and video data sent from the user terminal, the processing server analyzes the current expression information of the user according to the video data, and generates an interaction response voice corresponding to the interaction request voice according to the expression information, and then sends the interaction response voice to the user terminal. The specific processing in the processing server will be detailed in the following embodiments.

The following is the processing procedure on the server side.

Figure 5:
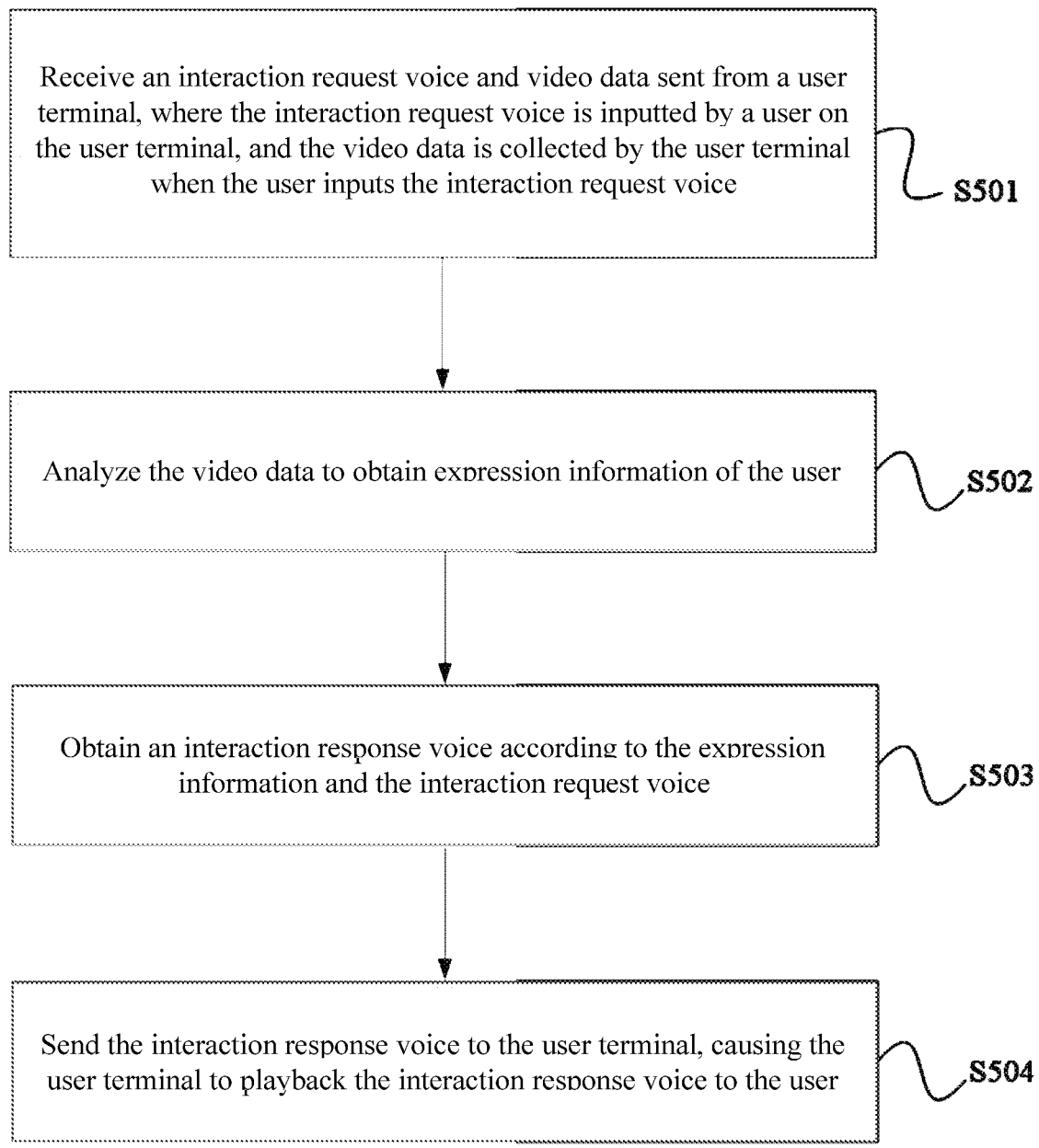
FIG. 5 is a flowchart of a third human-machine interaction processing method embodiment according to an embodiment of the present disclosure.

FIG. 5 is a flowchart of a third human-machine interaction processing method embodiment according to an embodiment of the present disclosure. The entity for implementing the method is a processing server. As shown in FIG. 5, the method includes:

S501: receive an interaction request voice and video data sent from a user terminal, where the interaction request voice is inputted by a user on the user terminal, and the video data is collected by the user terminal when the user inputs the interaction request voice; and S502: analyze the video data to obtain expression information of the user.

The expression information of the user is used in identifying the emotion of the user.

Optionally, the expression information of the user may be the user's expression type, which may include, for example, joy, anger, sadness, happy and expressionless. Being expressionless indicates that the user is not currently exhibiting any specific emotion, i.e., there is no emotional tone.

S503: obtain an interaction response voice according to the expression information and the interaction request voice.

As an optional implementation, the processing server may determine the content of the interaction response voice according to the content of the interaction request voice, and determine the audio feature of the interaction response voice according to the expression information.

Illustratively, when the content of the interaction request voice inputted from the user at the user terminal is "thank you", the processing server will accordingly determine "you are welcome" to be the content of the interaction response voice. Further, the processing server will determine the audio features for the "you are welcome" according to the expression information, that is, determine which tone should be specifically used to present the "you are welcome".

As another optional implementation, the processing server may also determine the content of the interaction response voice according to the expression information and the interaction request voice, and then determine the audio feature of the interaction response voice according to the expression information.

Specifically, the content of the interaction response voice to be fed back is not the same if the expression information is different, even when the interaction request voice is the same. Illustratively, suppose the user's interaction request voice is "thank you", if "joy" is the user's expression when inputting the voice, the content of the interaction response voice may be "glad you like it". Instead, if "anger" is the user's expression when inputting the voice, the content of the interaction response voice may be, "is there something wrong with the service". Further, the audio features of the interaction response voice are determined according to the expression information.

S504: send the interaction response voice to the user terminal, causing the user terminal to playback the interaction response voice to the user.

In this embodiment, according to video data of a user when inputting an interaction request voice to a user terminal, a processing server analyzes the user's expression information from the video data, and then generates an interaction response voice according to the expression information and the interaction request voice inputted by the user, imbuing the interaction response voice with an emotional tone matching the current emotion of the user, so that the human-machine interaction process is no longer monotonous, greatly enhancing the user experience.

On the basis of the aforementioned embodiment, this embodiment involves a specific method for the processing server to analyze the video data to obtain expression information of the user.

Figure 6:
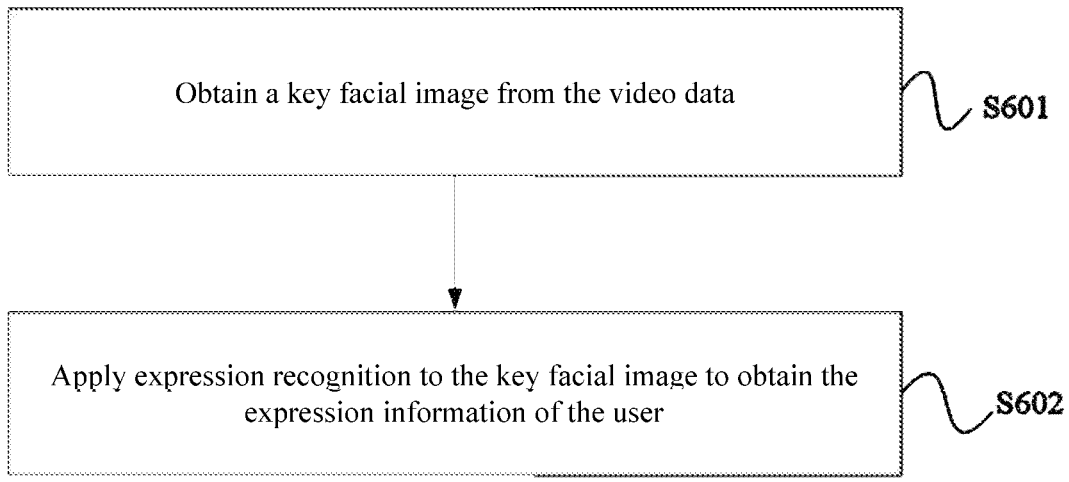
FIG. 6 is a flowchart of a fourth human-machine interaction processing method embodiment according to an embodiment of the present disclosure.

FIG. 6 is a flowchart of a fourth human-machine interaction processing method embodiment according to an embodiment of the present disclosure. As shown in FIG. 6, the step S502 includes:

S601: obtain a key facial image from the video data.

The key facial image may be an image with better image quality, higher definition and a more complete facial contour.

Optionally, the key facial image may be one or more images.

S602: apply expression recognition to the key facial image to obtain the expression information of the user.

In an optional implementation, the processing server may perform the expression recognition through a special prediction model server.

In another optional implementation, the processing server may identify the expression information by evaluating key pixel points in the key facial image. The key pixel point may refer to a pixel point corresponding to a key portion, such as a mouth or an eye. The current expression information of the user may be obtained by analyzing the key pixel points.

On the basis of the aforementioned embodiment, this embodiment involves a process of expression recognition via a prediction model server.

Figure 7:
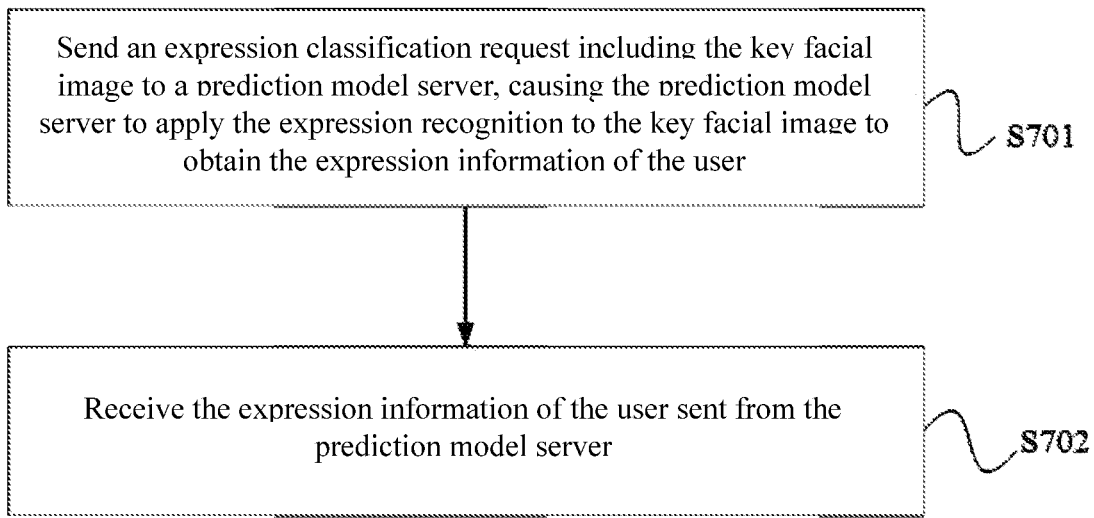
FIG. 7 is a flowchart of a fifth human-machine interaction processing method embodiment according to an embodiment of the present disclosure.

FIG. 7 is a flowchart of a fifth human-machine interaction processing method embodiment according to an embodiment of the present disclosure. As shown in FIG. 7, the step S602 includes:

S701: send an expression classification request including the key facial image to a prediction model server, causing the prediction model server to apply the expression recognition to the key facial image to obtain the expression information of the user; and S702: receive the expression information of the user sent from the prediction model server.

Optionally, one or more instances of the facial expression recognition model are loaded on the prediction model server. The facial expression recognition model may be a convolutional neural network model, and has been pre-trained with a large amount of fully-meshed training data. Additionally, the model may be updated further with new training data continuously.

Optionally, the key facial image may be the input to the facial expression recognition model, which in turn may output the expression type information corresponding to the key facial image. Illustratively, the expression type outputted from the facial expression recognition model may be 0, 1, 2, 3, 4, 5, where 0 represents emotionless, 1 represents joy, 2 represents anger, 3 represents sadness and 4 represents happy.

Optionally, the facial expression recognition model may consist of a convolutional layer, a pooling layer, a full connected layer, and the like. The convolution layer scans and convolves the original facial image or feature map by using convolution kernels with different weights, to extract therefrom features with various meanings, and then outputs the features to the feature map. The pooling layer performs dimensionality reduction operation on the feature map, preserving the main features in the feature map, so as to offer high robustness against deformation, blur, illumination changes etc. in the facial image, as well as offer higher potential for generalization for classification tasks.

As mentioned earlier, one or more instances of the facial expression recognition model are loaded on the prediction model server. During a specific implementation, a quantity of the prediction model servers and a quantity of the facial expression recognition models thereon can be flexibly configured as needed.

In an example, one prediction model server may be provided, on which multiple instances of facial expression recognition model are deployed.

In another example, multiple prediction model servers may be provided, on each of which one instance of facial expression recognition model is deployed.

In yet another example, multiple prediction model servers may be provided, on each of which multiple instances of facial expression recognition model are deployed.

Optionally, regardless of which of the above deployment modes is adopted, when the processing server sends an expression classification request to the prediction model server, the processing server may always send the expression classification request including the key facial image to a prediction model server which has processing resource, according to a load balancing policy.

Illustratively, assuming the deployment mode in the third example above is adopted, the processing server may firstly acquire the load status of each facial expression recognition model instances on each of the prediction model servers. Further, the processing server may select a facial expression recognition model in an idle state on the prediction model server that currently has the lowest resource occupation ratio.

As mentioned earlier, one or more key facial images may be obtained by the processing server from the video data. When one key facial image is obtained, it will be directly sent to the prediction model server to determine the expression information corresponding to the key facial image. When more key facial images are obtained, optionally, each key facial image may be inputted to the facial expression recognition model to obtain its corresponding expression information. Further, all of the expression information corresponding to each key facial image may be weighted to obtain the expression information of the user.

Illustratively, the processing server determines a weight for each key facial image according to the image quality of the key facial image. Further, the expression information corresponding to each of the key facial images is obtained. Further, the results obtained by the expression information corresponding to each of the key facial images multiplied by its corresponding weight, are summed together to obtain the expression information of the user.

On the basis of the aforementioned embodiment, this embodiment involves a process during which a processing server obtains an interaction response voice according to the expression information and the interaction request voice.

Figure 8:
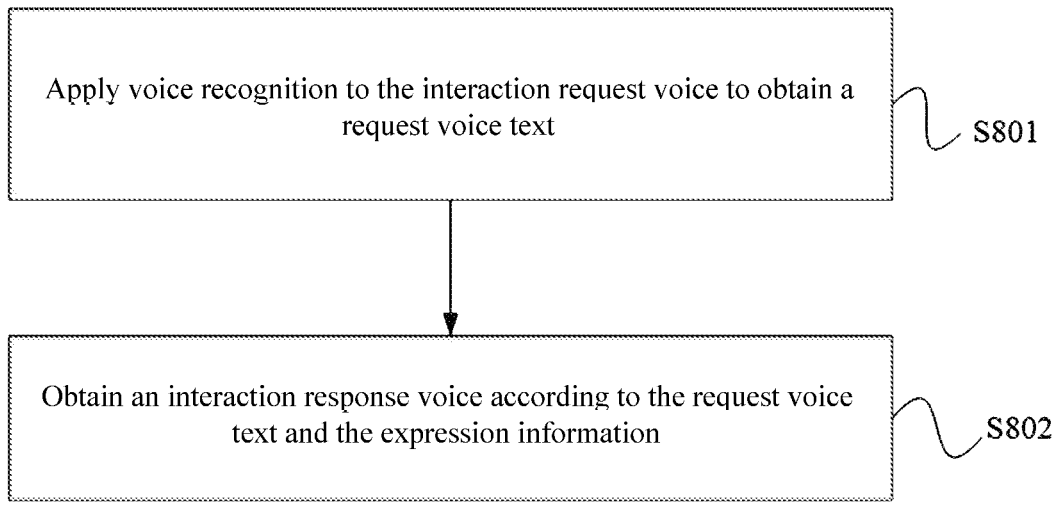
FIG. 8 is a flowchart of a sixth human-machine interaction processing method embodiment according to an embodiment of the present disclosure.

FIG. 8 is a flowchart of a sixth human-machine interaction processing method embodiment according to an embodiment of the present disclosure. As shown in FIG. 8, the step S503 includes:

S801: apply voice recognition to the interaction request voice to obtain a request voice text; and S802: obtain an interaction response voice according to the request voice text and the expression information.

Where, voice content of the interaction response voice corresponds to the expression information, and/or, audio feature of the interaction response voice corresponds to the expression information.

Optionally, after receiving the interaction request voice, the processing server converts the interaction request voice to obtain a request voice text corresponding to the interaction request voice. Further, the interaction response voice is determined based on the obtained request voice text and the expression information obtained via the above process.

Optionally, the interaction response voice may be determined according to the implementation described in the step S503. That is, in an optional implementation, the audio feature of the interaction response voice may correspond to the expression information, i.e., the interaction response voice may be determined according to the audio feature of the expression information. As another optional implementation, the voice content and audio feature of the interaction response voice may both correspond to the expression information, that is, the content of the interaction response voice may be determined according to both the expression information and the request voice text converted from the interaction request voice, and then the audio feature may be determined for the interaction response voice according to the expression information.

Optionally, the processing server may determine the interaction response voice via a pre-trained expression-voice model. Illustratively, the expression information and a response text, which may be obtained according to the interaction request text, are inputted to the expression-voice model which, in turn, outputs an interaction response voice with emotional tone.

Figure 9:
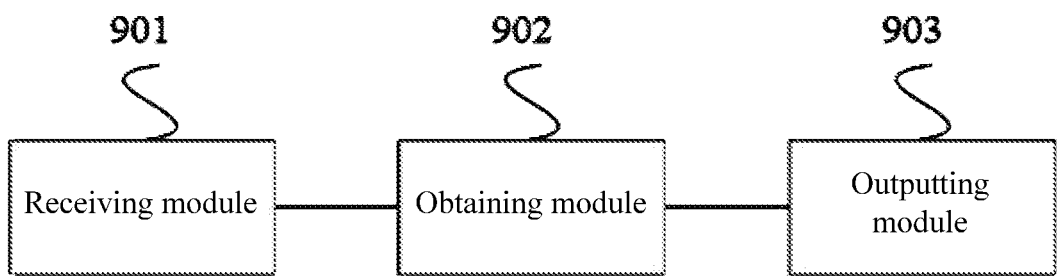
FIG. 9 is a block diagram of a first embodiment of a human-machine interaction processing apparatus according to an embodiment of the present disclosure.

FIG. 9 is a block diagram of a first embodiment of a human-machine interaction processing apparatus according to an embodiment of the present disclosure. As shown in FIG. 9, the apparatus includes:

a receiving module 901, configured to receive an interaction request voice inputted from a user, and collect video data of the user when inputting the interaction request voice;

an obtaining module 902, configured to obtain an interaction response voice corresponding to the interaction request voice, where the interaction response voice is obtained according to expression information of the user when inputting the interaction request voice and included in the video data; and an outputting module 903, configured to output the interaction response voice to the user.

The apparatus is configured to implement the method embodiment corresponding to the foregoing user terminal following similar implementation principles and producing similar technical effects, which will not be repeated herein.

Further, the receiving module 901 is specifically configured to:

collect, via a binocular camera, the video data of the user when inputting the interaction request voice.

Figure 10:
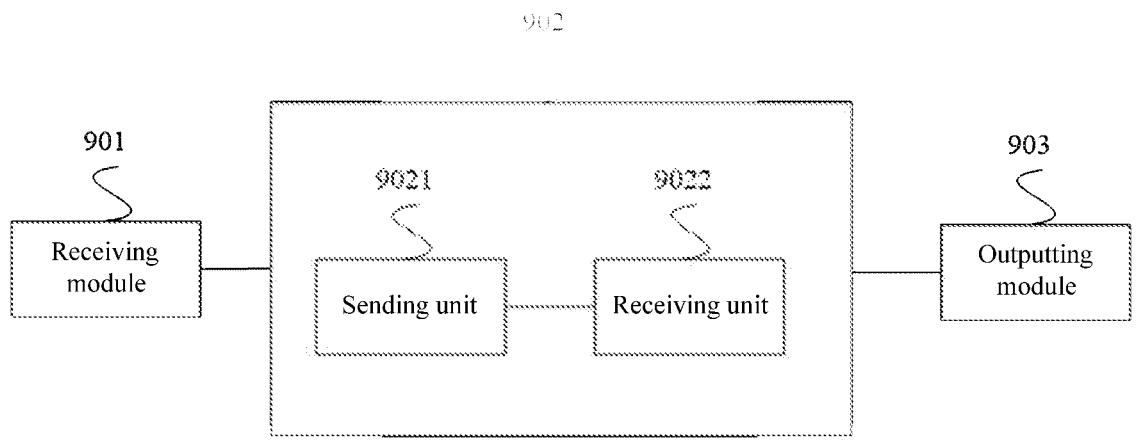
FIG. 10 is a block diagram of a second embodiment of a human-machine interaction processing apparatus provided in an embodiment of the present disclosure.

FIG. 10 is a block diagram of a second embodiment of a human-machine interaction processing apparatus provided in an embodiment of the present disclosure. As shown in FIG. 10, the obtaining module 902 includes:

a sending unit 9021, configured to send the interaction request voice and the video data to a processing server, causing the processing server to analyze the video data to obtain the expression information of the user, and obtain the interaction response voice according to the expression information and the interaction request voice; and a receiving unit 9022, configured to receive the interaction response voice fed back from the processing server.

Further, voice content of the interaction response voice corresponds to the expression information, and/or, audio feature of the interaction response voice corresponds to the expression information.

Figure 11:
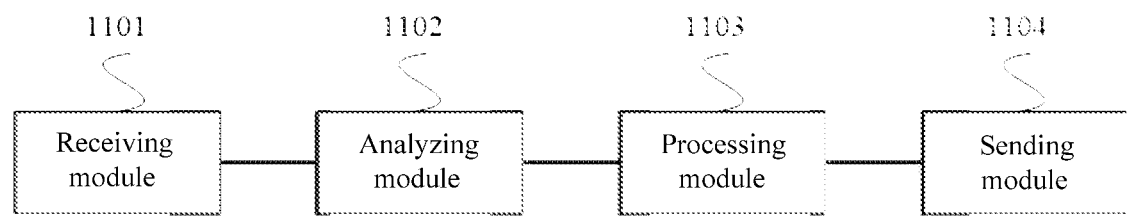
FIG. 11 is a block diagram of a first embodiment of another human-machine interaction processing apparatus provided in an embodiment of the present disclosure.

FIG. 11 is a block diagram of a first embodiment of another human-machine interaction processing apparatus provided in an embodiment of the present disclosure. As shown in FIG. 11, the apparatus includes:

a receiving module 1101, configured to receive an interaction request voice and video data sent from a user terminal, where the interaction request voice is inputted by a user on the user terminal, and the video data is collected by the user terminal when the user inputs the interaction request voice;

an analyzing module 1102, configured to analyze the video data to obtain expression information of the user;

a processing module 1103, configured to obtain an interaction response voice according to the expression information and the interaction request voice; and a sending module 1104, configured to send the interaction response voice to the user terminal, causing the user terminal to playback the interaction response voice to the user.

The apparatus is configured to implement the method embodiment corresponding to the foregoing processing server following similar implementation principles and producing similar technical effects, which will not be repeated herein.

Figure 12:
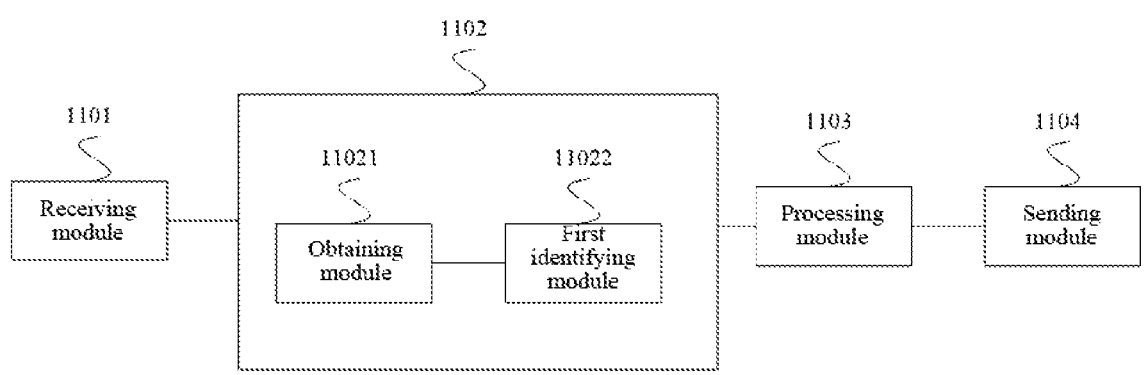
FIG. 12 is a block diagram of a second embodiment of another human-machine interaction processing apparatus provided in an embodiment of the present disclosure.

FIG. 12 is a block diagram of a second embodiment of another human-machine interaction processing apparatus provided in an embodiment of the present disclosure. As shown in FIG. 12, the analyzing module 1102 includes:

an obtaining unit 11021, configured to obtain a key facial image from the video data; and a first identifying unit 11022, configured to apply expression recognition to the key facial image to obtain the expression information of the user.

Further, the first identifying unit 11022 is specifically configured to:

send an expression classification request including the key facial image to a prediction model server, causing the prediction model server to apply the expression recognition to the key facial image to obtain the expression information of the user; and receive the expression information of the user sent from the prediction model server.

Further, the first identifying unit 11022 is specifically configured to:

send the expression classification request including the key facial image to the prediction model server which has processing resource, according to a load balancing policy.

Further, the first identifying unit 11022 is specifically configured to:

input each key facial image into a facial expression recognition model to obtain expression information corresponding to each key facial image; and apply weight to all of the expression information corresponding to each key facial image to obtain expression information of the user.

Figure 13:
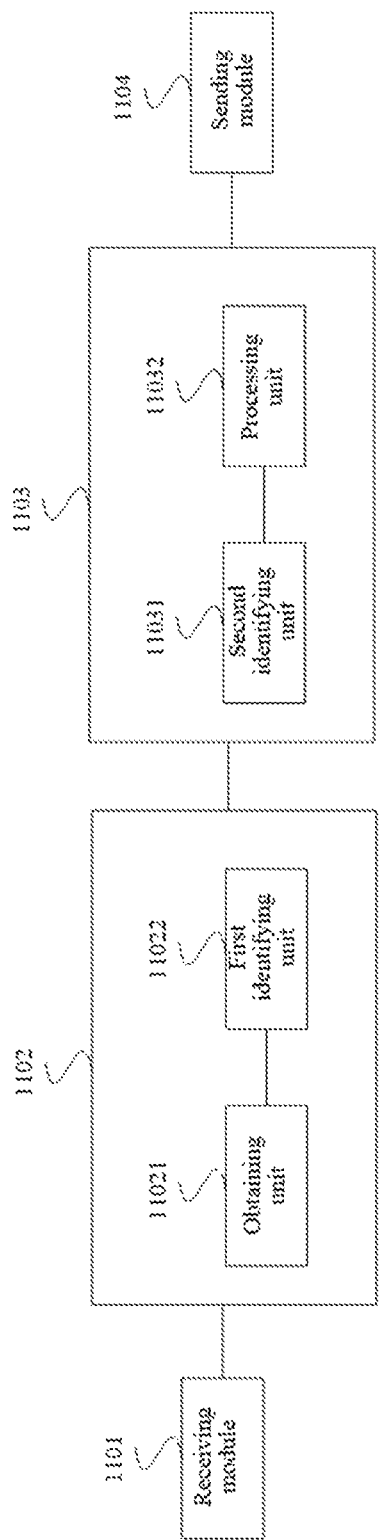
FIG. 13 is a block diagram of a third embodiment of another human-machine interaction processing apparatus provided in an embodiment of the present disclosure.

FIG. 13 is a block diagram of a third embodiment of another human-machine interaction processing apparatus provided in an embodiment of the present disclosure. As shown in FIG. 13, the processing module 1103 includes:

a second identifying unit 11031, configured to apply voice recognition to the interaction request voice to obtain a request voice text; and a processing unit 11032, configured to obtain an interaction response voice according to the request voice text and the expression information, where voice content of the interaction response voice corresponds to the expression information, and/or, audio feature of the interaction response voice corresponds to the expression information.

Figure 14:
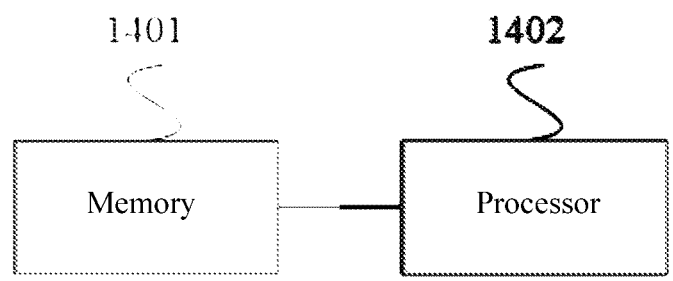
FIG. 14 is a block diagram of a user terminal entity provided in an embodiment of the present disclosure.

FIG. 14 is a block diagram of a user terminal entity provided in an embodiment of the present disclosure. As shown in FIG. 14, the user terminal includes:

a memory 1401, configured to store program instructions; and a processor 1402, configured to call and execute the program instructions in the memory 1401 to perform the method steps where the user terminal is involved in the foregoing method embodiments.

Figure 15:
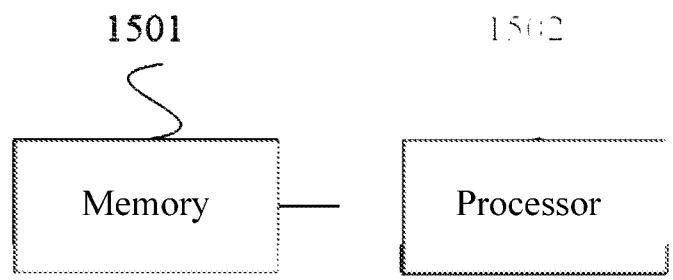
FIG. 15 is a block diagram of a processing server entity provided in an embodiment of the present disclosure.

FIG. 15 is a block diagram of a processing server entity provided in an embodiment of the present disclosure. As shown in FIG. 15, the processing server includes:

a memory 1501, configured to store program instructions; and a processor 1502, configured to call and execute the program instructions in the memory 1501 to perform the method steps where the processing server is involved in the foregoing method embodiments.

The present disclosure also provides a human-machine interaction processing system which includes the aforementioned user terminal and the aforementioned processing server.

It will be understood by those skilled in the art that all or part of the steps of the foregoing method embodiments may be implemented by hardware in relation to program instructions. The aforementioned program can be stored in a computer readable storage medium. The program, when executed, executes steps incorporating the foregoing method embodiments, and the foregoing storage medium includes various media that can store program codes, such as a ROM, a RAM, a magnetic disk, or an optical disk.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A human-machine interaction processing method, comprising:

receiving an interaction request voice inputted from a user, and collecting video data of the user when inputting the interaction request voice;

obtaining an interaction response voice corresponding to the interaction request voice, wherein a text of voice content of the interaction response voice is obtained according to expression information of the user when inputting the interaction request voice, the expression information of the user being comprised in the video data; and outputting the interaction response voice to the user;

wherein the obtaining the interaction response voice corresponding to the interaction request voice comprises:

sending the interaction request voice and the video data to a processing server, causing the processing server to analyze the video data to obtain the expression information of the user, and to obtain the text of voice content of the interaction response voice according to the expression information and the interaction request voice; and receiving the interaction response voice comprising the text of voice content fed back from the processing server;

wherein the expression information of the user is obtained by the processing server in following manner;

obtaining key facial images from the video data;

sending, according to a load balancing policy, an expression classification request comprising the key facial images to a prediction model server which has processing resource, cause the prediction model server to apply expression recognition to the key facial images to obtain the expression information of the user; and receiving the expression information of the user sent from the prediction model server.

2. The method according to claim 1, wherein the collecting the video data of the user when inputting the interaction request voice comprises:

collecting, via a binocular camera, the video data of the user when inputting the interaction request voice.

3. The method according to claim 1, wherein audio feature of the interaction response voice corresponds to the expression information.

4. A human-machine interaction processing method, comprising:

receiving an interaction request voice and video data sent from a user terminal, wherein the interaction request voice is inputted by a user on the user terminal, and the video data is collected by the user terminal when the user inputs the interaction request voice;

analyzing the video data to obtain expression information of the user;

obtaining a text of voice content of an interaction response voice according to the expression information and the interaction request voice; and sending the interaction response voice to the user terminal, causing the user terminal to playback the interaction response voice to the user;

wherein the analyzing the video data to obtain the expression information of the user comprises:

obtaining key facial images from the video data; and sending, according to a load balancing policy, an expression classification request comprising the key facial images to a prediction model server which has processing resource, causing the prediction model server to apply expression recognition to the key facial images to obtain the expression information of the user; and receiving the expression information of the user sent from the prediction model server.

5. The method according to claim 4, wherein the expression information of the user is obtained by the prediction model server in following manner:

inputting each of the key facial images into a facial expression recognition model to obtain expression information corresponding to the each of the key facial images; and applying weight to all of the expression information corresponding to the key facial images to obtain expression information of the user.

6. The method according to claim 4, wherein the obtaining the interaction response voice according to the expression information and the interaction request voice comprises:

applying voice recognition to the interaction request voice to obtain a request voice text; and obtaining the text of voice content of the interaction response voice according to the request voice text and the expression information, wherein audio feature of the interaction response voice corresponds to the expression information.

7. A human-machine interaction processing apparatus, comprising:

a memory, configured to store program instructions; and a processor, configured to call and execute the program instructions in the memory to:

receive an interaction request voice inputted from a user, and collect video data of the user when inputting the interaction request voice;

obtain an interaction response voice corresponding to the interaction request voice, wherein a text of voice content of the interaction response voice is obtained according to expression information of the user when inputting the interaction request voice, the expression information of the user being comprised in the video data; and output the interaction response voice to the user;

wherein the processor is further configured to call and execute the program instructions in the memory to:

send the interaction request voice and the video data to a processing server, causing the processing server to analyze the video data to obtain the expression information of the user, and to obtain the text of voice content of the interaction response voice according to the expression information and the interaction request voice; and receive the interaction response voice comprising the text of voice content fed back from the processing server;

wherein the expression information of the user is obtained by the processing server in following manner;

obtaining key facial images from the video data;

sending, according to a load balancing policy, an expression classification request comprising the key facial images to a prediction model server which has processing resource, cause the prediction model server to apply expression recognition to the key facial images to obtain the expression information of the user; and receiving the expression information of the user sent from the prediction model server.

8. The apparatus according to claim 7, wherein the processor is configured to call and execute the program instructions in the memory to:

collect, via a binocular camera, the video data of the user when inputting the interaction request voice.

9. The apparatus according to claim 7, wherein audio feature of the interaction response voice corresponds to the expression information.

10. A human-machine interaction processing apparatus, comprising:

a memory, configured to store program instructions; and a processor, configured to call and execute the program instructions in the memory to:

receive an interaction request voice and video data sent from a user terminal, wherein the interaction request voice is inputted by a user on the user terminal, and the video data is collected by the user terminal when the user inputs the interaction request voice;

analyze the video data to obtain expression information of the user;

obtain a text of voice content of an interaction response voice according to the expression information and the interaction request voice; and send the interaction response voice to the user terminal, causing the user terminal to playback the interaction response voice to the user;

wherein the processor is further configured to call and execute the program instructions in the memory to:

obtain key facial images from the video data;

send, according to a load balancing policy, an expression classification request comprising the key facial images to a prediction model server which has processing resource, causing the prediction model server to apply expression recognition to the key facial images to obtain the expression information of the user; and receive the expression information of the user sent from the prediction model server.

11. The apparatus according to claim 10, wherein the expression information of the user is obtained by the prediction model server in following manner:

inputting each of the key facial images into a facial expression recognition model to obtain expression information corresponding to the each of the key facial images; and applying weight to all of the expression information corresponding to the key facial images to obtain expression information of the user.

12. The apparatus according to claim 10, wherein the processor is configured to call and execute the program instructions in the memory to:

apply voice recognition to the interaction request voice to obtain a request voice text; and obtain the text of voice content of the interaction response voice according to the request voice text and the expression information, wherein audio feature of the interaction response voice corresponds to the expression information.

\* \* \* \* \*